UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

1,411,708. Specification of Letters Patent. Patented Apr. 4, 1922.

No Drawing. Application filed April 5, 1921. Serial No. 458,736.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, (Case A,) of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in the lower monohydroxy aliphatic alcohols or in monochlorbenzol, it has been found that such single solvents by themselves do not dissolve a sufficient proportion of the ethers to make a desirably thick, flowable composition or dope, such as may be used, for example, in the manufacture of photographic film base by customary methods, or in other plastic arts.

I have discovered, however, that an adequately strong and useful solvent may be prepared by mixing such alcohols with monochlorbenzol. I may combine, for instance, methyl alcohol, ethyl alcohol, propyl alcohol, isopropyl alcohol, butyl alcohol (normal, iso or secondary) and fusel oil or the amyl alcohols, either singly or in various mixtures with monochlorbenzol.

The proportions may be greatly varied, but I find that a very useful range is from 50 to 10 parts by weight of alcohol mixed with 50 to 90 parts of monochlorbenzol. In the compound solvents thus prepared I dissolve, for example, water-insoluble ethyl cellulose until thick viscous flowable solutions thereof are obtained. Of course, the amount of cellulose ether thus dissolved can be greatly varied, but I may mention a solution containing 1 part of the ether to 5 parts of the compound solvent by weight as merely one example. Other substances which impart additional suppleness or incombustibility, or other qualities to the film, may be then added to the dope, such modifying agents being, for example, triphenyl phosphate, camphor, tricesyl phosphate, etc. The monochlorbenzol, being of relatively low volatility remains in considerable amounts in the film and imparts useful properties thereto. Its homologues, of which monochlortoluol is one example, acts equivalently.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A compound solvent for ethers of cellulose, comprising a mixture of monochlorbenzol and a monohydroxy aliphatic alcohol.

2. A compound solvent for alkyl ethers of cellulose, comprising from 50 to 90 parts by weight of monochlorbenzol and 50 to 10 parts of a monohydroxy aliphatic alcohol.

3. A compound solvent for alkyl ethers of cellulose, comprising approximately equal parts by weight of monochlorbenzol and methyl alcohol.

4. A viscous flowable film-forming composition, comprising an alkyl ether of cellulose dissolved in a mixture of monochlorbenzol and a monohydroxy aliphatic alcohol.

5. A viscous flowable film-forming composition, comprising an alkyl ether of cellulose dissolved in a compound solvent containing from 50 to 90 parts by weight of monochlorbenzol and from 50 to 10 parts by weight of a monohydroxy aliphatic alcohol.

6. A viscous flowable film-forming composition, comprising an alkyl ether of cellulose dissolved in a compound solvent containing approximately 50 parts by weight of monochlorbenzol and 50 parts of methyl alcohol.

7. A viscous flowable film-forming composition, comprising water-insoluble ethyl cellulose dissolved in a compound solvent containing monochlorbenzol and a liquid monohydroxy aliphatic alcohol.

8. A composition of matter, comprising 1 part by weight of water-insoluble ethyl cellulose dissolved in approximately 5 parts by weight of a compound solvent containing approximately equal parts by weight of monochlorbenzol and a liquid monohydroxy aliphatic alcohol.

9. A composition of matter, comprising an ether of cellulose and monochlorbenzol.

10. As an article of manufacture, a flowed or deposited film comprising an alkyl ether of cellulose and monochlorbenzol.

11. As an article of manufacture, a deposited or flowed flexible transparent film, comprising water-insoluble ethyl cellulose and monochlorbenzol.

Signed at Rochester, New York, this 26th day of March, 1921.

STEWART J. CARROLL.